United States Patent
Su et al.

(10) Patent No.: US 9,717,055 B2
(45) Date of Patent: Jul. 25, 2017

(54) METHOD FOR PERFORMING ALARM GROUPING CONTROL OF AN ELECTRONIC DEVICE WITH AID OF AT LEAST ONE GROUPING CONTROL STRATEGY, AND ASSOCIATED APPARATUS

(71) Applicant: MEDIATEK INC., Hsin-Chu (TW)

(72) Inventors: Wen-Hung Su, Taichung (TW); Yi-Chin Lin, Kaohsiung (TW); Ting Deng, Chengdou (CN); Guanghua Chen, Chengdou (CN)

(73) Assignee: MEDIATEK INC., Hsin-Chu (TW)

( * ) Notice: Subject to any disclaimer, the term of this patent is extended or adjusted under 35 U.S.C. 154(b) by 71 days.

(21) Appl. No.: 14/622,938

(22) Filed: Feb. 16, 2015

(65) Prior Publication Data

US 2015/0235542 A1    Aug. 20, 2015

Related U.S. Application Data

(60) Provisional application No. 61/942,313, filed on Feb. 20, 2014.

(30) Foreign Application Priority Data

Feb. 11, 2015  (CN) .......................... 2015 1 0071713

(51) Int. Cl.
*G08B 19/00*   (2006.01)
*H04W 52/02*   (2009.01)
*H04M 1/725*   (2006.01)

(52) U.S. Cl.
CPC ..... *H04W 52/027* (2013.01); *H04W 52/0229* (2013.01); *H04W 52/0251* (2013.01);
(Continued)

(58) Field of Classification Search
CPC ............. H04M 19/04; H04M 1/72522; H04M 1/72566; H04W 52/027; H04W 52/0258;
(Continued)

(56) References Cited

U.S. PATENT DOCUMENTS

2005/0181772 A1    8/2005  Crowell
2006/0113377 A1*   6/2006  Wilcox .............. G06K 19/0705
                                                          235/380
(Continued)

FOREIGN PATENT DOCUMENTS

CN    102385531 A    3/2012
CN    102968172 A    3/2013
CN    103218033 A    7/2013

*Primary Examiner* — Anh V La
(74) *Attorney, Agent, or Firm* — Han IP Corporation; Andy M. Han (57) ABSTRACT

A method for performing alarm grouping control of an electronic device and an associated apparatus are provided, where the method includes the steps of: shifting the execution timing of at least one alarm of a plurality of alarms to group the plurality of alarms into at least one grouped alarm according to at least one grouping control strategy, wherein the execution timing of the at least one alarm is shifted to the execution timing of the at least one grouped alarm; and according to the at least one grouped alarm, controlling whether to wake up at least a portion of the electronic device.

20 Claims, 9 Drawing Sheets

(52) U.S. Cl.
CPC .... *H04W 52/0258* (2013.01); *H04M 1/72522* (2013.01); *H04M 1/72566* (2013.01); *Y02B 60/50* (2013.01)

(58) Field of Classification Search
CPC ............ H04W 5/0229; H04W 5/0258; H04W 52/0251
USPC .............. 340/506, 521, 522; 455/418, 414.2, 455/414.3, 41.2, 423; 368/73; 715/847, 715/726, 810
See application file for complete search history.

(56) References Cited

U.S. PATENT DOCUMENTS

| | | | |
|---|---|---|---|
| 2008/0239881 A1* | 10/2008 | Kokuryu .............. | G04G 13/026 368/73 |
| 2013/0283175 A1* | 10/2013 | Faridian .............. | H04L 67/1095 715/736 |
| 2014/0074535 A1* | 3/2014 | Woo-Kwan-Chung | G06Q 10/1095 705/7.19 |
| 2014/0120896 A1* | 5/2014 | Park .................. | H04M 1/72558 455/418 |
| 2014/0253319 A1* | 9/2014 | Chang ............... | H04M 1/72522 340/521 |

* cited by examiner

FIG. 9

METHOD FOR PERFORMING ALARM GROUPING CONTROL OF AN ELECTRONIC DEVICE WITH AID OF AT LEAST ONE GROUPING CONTROL STRATEGY, AND ASSOCIATED APPARATUS

CROSS REFERENCE TO RELATED APPLICATIONS

This application claims the benefit of U.S. Provisional Application No. 61/942,313, which was filed on Feb. 20, 2014, and is included herein by reference.

BACKGROUND

The present invention relates to intelligent alarm grouping of a system, and more particularly, to a method for performing alarm grouping control of an electronic device, and an associated apparatus.

According to the related art, a processor of a conventional portable electronic device such as a conventional multifunctional mobile phone can be woken up from a sleep mode by alarms, in order to perform operations at predetermined time points, respectively. However, some problems may occur. For example, many applications installed by the user and/or vendor of the conventional multifunctional mobile phone may use, independently, a conventional alarm control module in the conventional multifunctional mobile phone to wake up the processor of the conventional multifunctional mobile phone from the sleep mode. As there may be many wake-up events, the conventional multifunctional mobile phone may drain the battery thereof quickly. As a result, in a situation where the user does not use the conventional multifunctional mobile phone many times in a day, the user may still feel that the conventional multifunctional mobile phone drains the battery very fast. In another example, the user may feel that the conventional multifunctional mobile phone drains the battery faster than a conventional feature phone. In another example, the user may feel that the standby time of the conventional multifunctional mobile phone is not as long as the standby time of a conventional feature phone.

In conclusion, the related art does not serve the user well. Therefore, a novel architecture for alarm control of an electronic device is required for enhancing the overall performance.

SUMMARY

It is an objective of the claimed invention to provide a method for performing alarm grouping control of an electronic device, and an associated apparatus, in order to enhance the overall performance.

It is another objective of the claimed invention to provide a method for performing alarm grouping control of an electronic device, and an associated apparatus, in order to improve the experience of the user.

According to at least one preferred embodiment, a method for performing alarm grouping control of an electronic device is provided, where the method is applied to the electronic device. The method comprises the steps of: shifting an execution timing (e.g. an execution time point such as a time point on the time axis) of at least one alarm of a plurality of alarms to group the plurality of alarms into at least one grouped alarm according to at least one grouping control strategy, wherein the execution timing of the at least one alarm is shifted to an execution timing (e.g. an execution time point such as a time point on the time axis) of the at least one grouped alarm; and according to the at least one grouped alarm, controlling whether to wake up at least a portion of the electronic device.

According to at least one preferred embodiment, an apparatus for performing alarm grouping control of an electronic device is provided, where the apparatus comprises at least one portion (e.g. a portion or all) of the electronic device. The apparatus comprises a processing circuit that is capable of controlling operations of the electronic device, and the processing circuit comprises an alarm grouping control module and a wake-up control module. In addition, the alarm grouping control module is capable of shifting an execution timing (e.g. an execution time point such as a time point on the time axis) of at least one alarm of a plurality of alarms to group the plurality of alarms into at least one grouped alarm according to at least one grouping control strategy, wherein the execution timing of the at least one alarm is shifted to an execution timing (e.g. an execution time point such as a time point on the time axis) of the at least one grouped alarm. Additionally, according to the at least one grouped alarm, the wake-up control module is capable of controlling whether to wake up at least a portion of the electronic device. For example, the processing circuit may comprise at least one processor. More particularly, one or more modules within the alarm grouping control module and the wake-up control modules can be program modules running on the at least one processor.

It is an advantage of the present invention that the present invention method and the associated apparatus can enhance the overall performance of electronic devices. In addition, the present invention method and the associated apparatus can improve the experience of the user.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
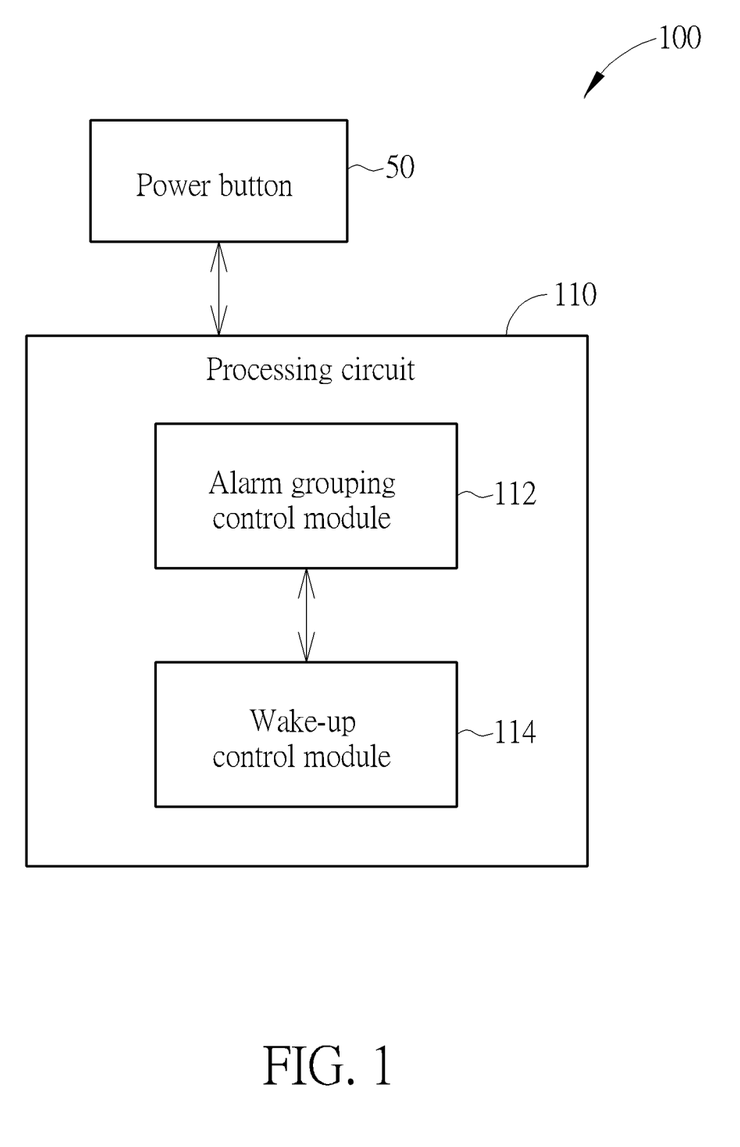
FIG. 1 is a diagram of an apparatus for performing alarm grouping control of an electronic device according to an embodiment of the present invention.

FIG. 1 is a diagram of an apparatus 100 for performing alarm grouping control of an electronic device according to an embodiment of the present invention, where the apparatus 100 may comprise at least one portion (e.g. a portion or all) of the electronic device. For example, the apparatus 100 may comprise a portion of the electronic device mentioned above, such as at least one hardware circuit within the electronic device. In another example, the apparatus 100 can be the whole of the electronic device mentioned above. In another example, the apparatus 100 may comprise a system comprising the electronic device mentioned above (e.g. an information processing system comprising the electronic device). Examples of the electronic device may include, but not limited to, a mobile phone (e.g. a multifunctional mobile phone), a personal digital assistant (PDA), a tablet, a wearable device and a personal computer such as a laptop computer.

As shown in FIG. 1, the apparatus 100 may comprise a processing circuit 110 which may be capable of controlling operations of the electronic device. For example, the processing circuit 110 may be capable of controlling one or more operations of the electronic device with aid of one or more alarms. According to this embodiment, the processing circuit 110 may comprise an alarm grouping control module 112 capable of shifting an execution timing of at least one alarm of a plurality of alarms to group the plurality of alarms into at least one grouped alarm according to at least one grouping control strategy, wherein the execution timing of the at least one alarm is shifted to an execution timing of the at least one grouped alarm. The processing circuit 110 may further comprise a wake-up control module 114 capable of controlling whether to wake up at least a portion of the electronic device according to the at least one grouped alarm. Please note that an execution timing of an alarm may represent an execution time point of this alarm, such as a time point on the time axis.

The alarm grouping control may be triggered by one or more predetermined conditions. For one example, the alarm grouping control may be triggered when the remaining charge of the battery of the electronic device is lower than a threshold. For another example, the alarm grouping control may be triggered every predetermined period of time. For still another example, the alarm grouping control may be triggered if a screen of the electronic device is off for a predetermined period of time. In this embodiment, the processing circuit 110 may be further capable of comparing a length of a time period during which a screen of the electronic device is kept off with a predetermined threshold to generate a comparing result, and the processing circuit 110 may be further capable of determining whether to perform alarm grouping control according to the comparing result. For example, the screen of the electronic device may be kept off for M minutes and the processing circuit 110 may find that M is not less than a predetermined threshold N, and then the processing circuit 110 may determine that alarm grouping control should be performed or triggered. The screen may be turned off in many ways. For example, a power button 50 may be pressed to turn off the screen of the electronic device. Although the alarm grouping control module 112 and wake-up control module 114 in this embodiment are included in the processing circuit 110, a portion or the entirety thereof can be external to the processing circuit 110 in some embodiments. The alarm grouping control module 112 and the wake-up control module 114 can be implemented by hardware, software, firmware or a combination thereof. For example, the alarm grouping control module 112 and the wake-up control module 114 can be implemented by program codes read from a storage internal or external to the processing circuit 110 and executed by at least a portion of the processing circuit 110. When alarm grouping control is performed, as the time interval(s) between the congregated execution(s) of alarms may be properly controlled, the processing circuit 110 can reduce the total number of wakeups and further reduce the power consumption correspondingly.

Please note that, if all alarm executions should be indistinctively congregated, problems causing unpleasant user experience may be introduced because the applications may not be able to perform the expected operations at the expected time points. Examples of the problems causing unpleasant user experience may include, but not limited to, delayed reminder of calendar/alarm applications, delayed message receiving, abnormal data connection of the mobile network due to delayed reconnection execution, degraded global positioning system (GPS) precision due to delayed GPS searching/scanning, DHCP mechanism malfunctions. In order to prevent these problems, the processing circuit 110 may perform alarm grouping control according to at least one grouping control strategy (e.g. one or more grouping control strategies), where the at least one grouping control strategy may comprise a self-learning strategy (which may be implemented with the self-learning application grouping policy), a recovery strategy (which may be implemented with the recovery mechanism), a white type strategy (which may be implemented with one or more white types), and a conditional trigger strategy. As a result, the power consumption may be reduced with less side effects.

In one embodiment, the processing circuit 110 may execute program codes (e.g. program instructions), and may comprise at least one processor (e.g. one or more processors) such as a computer processor for executing the program codes. Although the program codes may be contained in the processing circuit 110, it can be stored in any storage located anywhere that the processing circuit 110 can access. For example, one or more modules within the alarm grouping control module 112 and the wake-up control modules 114 can be program modules running on the aforementioned at least one processor. This is for illustrative purposes only, and is not meant to be a limitation of the present invention.

Figure 2:
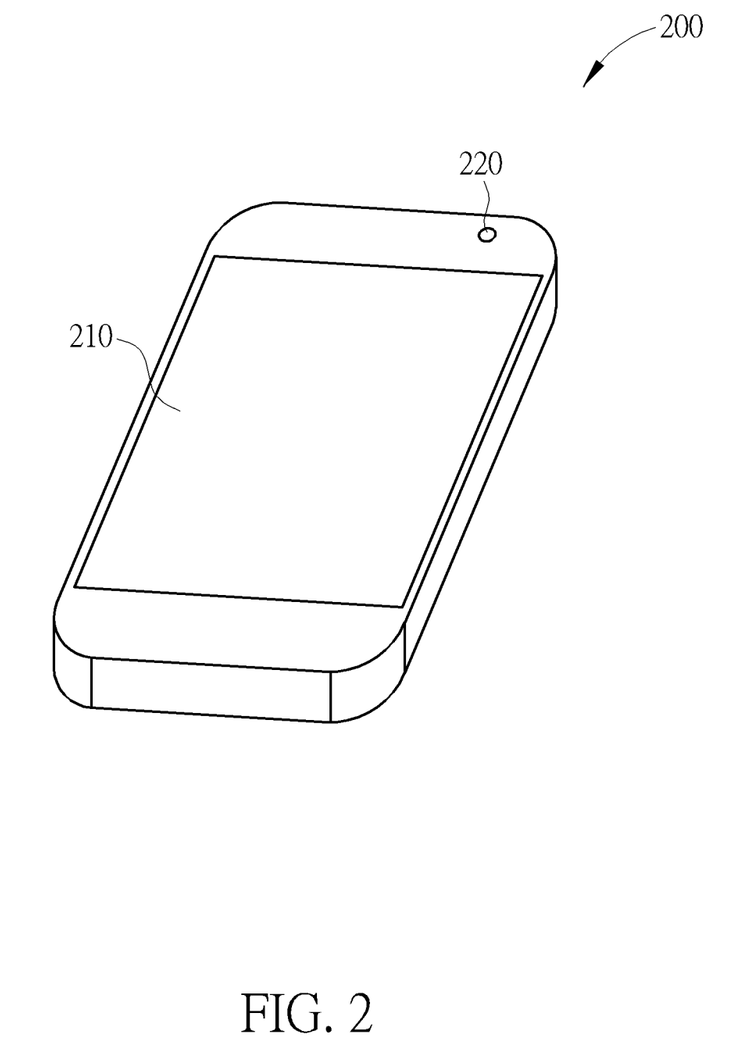
FIG. 2 illustrates a multifunctional mobile phone involved with the apparatus shown in FIG. 1 according to an embodiment of the present invention.

FIG. 2 illustrates a multifunctional mobile phone 200 involved with the apparatus 100 shown in FIG. 1 according to an embodiment of the present invention, where the multifunctional mobile phone 200 can be taken as an example of the electronic device mentioned above. This is for illustrative purposes only, and is not meant to be a limitation of the present invention. According to some embodiments, any other electronic device (e.g. another type of electronic device, such as an electronic device that is not a multifunctional mobile phone) can be taken as an example of the electronic device mentioned above. As shown in FIG. 2, the multifunctional mobile phone 200 may comprise a touch sensitive display module 210 (e.g. a touch screen) and a camera 220, where the touch sensitive display module 210 can be taken as an example of the screen mentioned in the embodiment shown in FIG. 1. This is for illustrative purposes only, and is not meant to be a limitation of the present invention.

Figure 3:
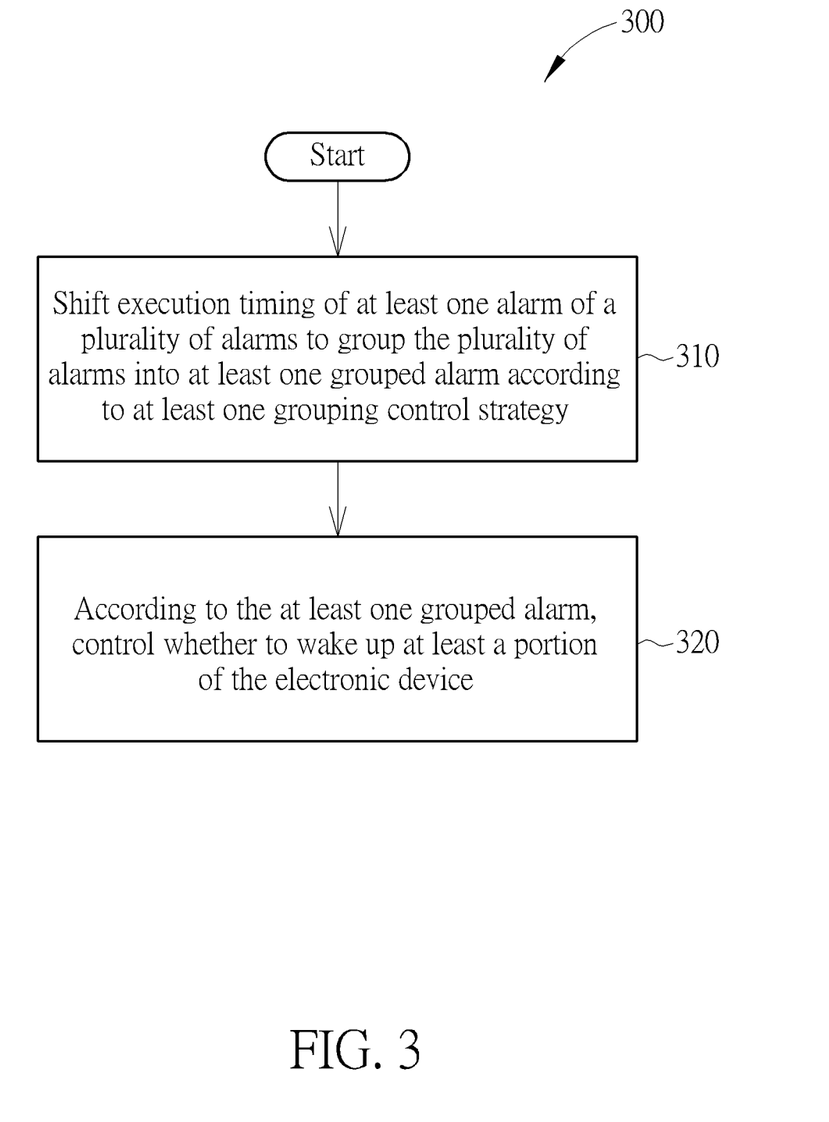
FIG. 3 illustrates a flowchart of method for performing alarm grouping control of an electronic device according to an embodiment of the present invention.

FIG. 3 illustrates a flowchart of method 300 for performing alarm grouping control of an electronic device according to an embodiment of the present invention. The method 300 shown in FIG. 3 can be applied to the apparatus 100 shown in FIG. 1 and the multifunctional mobile phone 200 of the embodiment shown in FIG. 2, and can be applied to the processing circuit 110 executing the program codes. For example, the program codes may be provided through a computer program product having program instructions (such as those mentioned above) for instructing a processing circuit such as that mentioned above to perform the method 300 shown in FIG. 3 (or at least one portion of operations of the method 300, such as one or more operations of any of the control schemes in the subsequent embodiments), where the computer program product may be implemented as a non-transitory computer-readable medium (e.g. a floppy disk or a compact disc-read only memory (CD-ROM)) storing the program instructions or an equivalent version thereof, such as a software package for being installed. This is for illustrative purposes only, and is not meant to be a limitation of the present invention. The method can be described as follows.

In Step 310, the processing circuit 110 (e.g. the alarm grouping control module 112 thereof) may shift an execution timing of at least one alarm (e.g. one or more alarms) of a plurality of alarms to group the plurality of alarms into at least one grouped alarm according to at least one grouping control strategy (e.g. one or more grouping control strategies within the plurality of grouping control strategies mentioned in the embodiment shown in FIG. 1), where the execution timing of the aforementioned at least one alarm is shifted to an execution timing of the aforementioned at least one grouped alarm. In this embodiment, the execution timing of the aforementioned at least one alarm may represent at least one execution time point of the aforementioned at least one alarm, such as at least one time point on the time axis. For example, in a situation where the aforementioned at least one alarm comprises a single alarm of the plurality of alarms, the execution timing of the at least one alarm is the execution time point of this single alarm. In another example, in a situation where the aforementioned at least one alarm comprises multiple alarms of the plurality of alarms, the execution timing of the at least one alarm comprises the execution time point of each of the multiple alarms. In addition, the execution timing of the aforementioned at least one grouped alarm may represent at least one execution time point of the aforementioned at least one grouped alarm, such as at least one time point on the time axis. For example, in a situation where the aforementioned at least one grouped alarm comprises a single grouped alarm, the execution timing of the at least one grouped alarm is the execution time point of this single grouped alarm. In another example, in a situation where the aforementioned at least one grouped alarm comprises multiple grouped alarms, the execution timing of the at least one grouped alarm comprises the execution time point of each of the multiple grouped alarms.

In Step 320, according to the aforementioned at least one grouped alarm, the processing circuit 110 (e.g. the wake-up control module 114 thereof) may control whether to wake up at least a portion of the electronic device. For example, when it is the execution timing of a grouped alarm within the aforementioned at least one grouped alarm, the processing circuit 110 (e.g. the wake-up control module 114 thereof) may wake up the portion of the electronic device, such as the aforementioned at least one processor. This is for illustrative purposes only, and is not meant to be a limitation of the present invention. In another example, when it is the execution timing of a non-grouped alarm (e.g. a remaining alarm after alarm grouping is performed, no matter whether this alarm is within or outside the plurality of alarms mentioned in Step 310), the processing circuit 110 (e.g. the wake-up control module 114 thereof) may wake up at least a portion of the electronic device.

According to this embodiment, the aforementioned at least one grouping control strategy may comprise the self-learning strategy mentioned in the embodiment shown in FIG. 1. For example, the processing circuit 110 may perform one or more learning operations by analyzing the application activity of one or more applications to categorize the one or more applications into one or more of a plurality of categories. The processing circuit 110 may determine whether to shift an execution timing of an alarm registered by an application according to a category into which the application is categorized. In one embodiment, at least two categories within the plurality of categories may correspond to different alarm usage levels, respectively. Additionally, a specific application may be categorized into a category corresponding to the minimum alarm usage level within the alarm usage levels, and the processing circuit 110 may prevent an execution timing of an alarm registered by this specific application from being shifted from an original execution timing, and therefore this alarm may not be grouped into any grouped alarm.

As mentioned above, at least two categories within the plurality of categories may correspond to different alarm usage levels, respectively. This is for illustrative purposes only, and is not meant to be a limitation of the present invention. According to some embodiments of the present invention, at least two categories within the plurality of categories may correspond to different data usage levels, respectively. In addition, a specific application of these embodiments may be categorized into a category corresponding to a minimum data usage level within the data usage levels, and the processing circuit 110 may allow an execution timing of an alarm registered by this specific application to be shifted, and therefore this alarm may be grouped into a grouped alarm. According to some embodiments of the present invention, at least two categories within the plurality of categories may correspond to different power consumption levels, respectively. In addition, a specific application of these embodiments may be categorized into a category corresponding to a minimum power consumption level within the power consumption levels, and the processing circuit 110 may prevent an execution timing of an alarm registered by this specific application from being shifted from an original execution timing, and therefore this alarm may not be grouped into any grouped alarm.

According to the embodiment shown in FIG. 3, the alarm grouping control may be performed according to the recovery strategy mentioned in the embodiment shown in FIG. 1.

For example, the processing circuit 110 may perform the operation of Step 310 before the screen of the electronic device (e.g. the touch sensitive display module 210) is turned on, and the processing circuit 110 may record an original execution timing of the at least one alarm. In addition, when the screen is turned on, the processing circuit 110 may recover the at least one alarm by shifting the execution timing of the at least one alarm back to the original execution timing.

According to the embodiment shown in FIG. 3, the aforementioned at least one grouping control strategy may comprise the white type strategy mentioned in the embodiment shown in FIG. 1. For example, the processing circuit 110 may determine whether an application belongs to at least one white type to generate a determining result. The processing circuit 110 may further prevent an execution timing of an alarm registered by the application from being shifted from an original execution timing according to the determining result. In addition, the processing circuit 110 may prevent the execution timing of an alarm registered by any application belonging to one or more white types from being shifted from an original execution timing, and therefore this alarm may not be grouped into any grouped alarm. It should be noted that the list of white types may vary with different design requirements and may be amended anytime. The list of white types may be an inclusion list or an exclusion list. The determination of whether an application belongs to at least one white type may be performed according to any information of an application. For one example, an application may be determined that belongs to at least one white type when it is a system process application. For another example, an application may be determined that not belongs to at least one white type when it is installed by the user of the electronic device. For still another example, an application may be determined that not belongs to at least one white type when it has messaging function.

According to the embodiment shown in FIG. 3, the alarm grouping control may be performed according to the conditional trigger strategy mentioned in the embodiment shown in FIG. 1. For example, the processing circuit 110 may compare a length of a time period during which a screen of the electronic device is kept off with a predetermined threshold to generate a comparing result, and may determine whether to perform alarm grouping control according to the comparing result. Additionally, the time period may be measured starting from the time point when the screen of the electronic device (e.g. the touch sensitive display module 210) is turned off. According to some embodiments of the present invention, when it is detected that the user uses the electronic device frequently (e.g. the screen is turned on frequently, the screen is touched frequently, etc.), the processing circuit 110 may not group alarms. In addition, when it is detected that charging the electronic device is performed (e.g. the user uses a charger of the electronic device to charge the electronic device), the processing circuit 110 may prevent performing alarm grouping control (e.g. the processing circuit 110 may not group alarms).

According to the embodiment shown in FIG. 3, an alarm may be used for waking up a processor or any other component of the electronic device. This is for illustrative purposes only, and is not meant to be a limitation of the present invention. For example, this processor can be the processing circuit 110. This is for illustrative purposes only, and is not meant to be a limitation of the present invention. In addition, the purpose of waking up may be controlling this processor or the other component to execute (or perform) the operation(s) that an application is going to perform. This is for illustrative purposes only, and is not meant to be a limitation of the present invention. The definition of a sleep mode of the processor or the other component in some embodiment may be directed to prevent providing this processor or the other component with power and/or clock (s). This is for illustrative purposes only, and is not meant to be a limitation of the present invention. The definition of the operation of waking up the processor or the other component in some embodiment may be directed to providing this processor or the other component with power and/or clock(s). This is for illustrative purposes only, and is not meant to be a limitation of the present invention. Additionally, the term "alarm usage" may be defined as the number of alarms triggered per unit of time. This is for illustrative purposes only, and is not meant to be a limitation of the present invention. Further, the term "data usage" may be defined as the data volume downloaded and/or uploaded per unit of time, or the number of packets transferred per unit of time. This is for illustrative purposes only, and is not meant to be a limitation of the present invention.

With aid of one or more grouping control strategies mentioned above (e.g. the self-learning strategy, the recovery strategy, the white type strategy, and/or the conditional trigger strategy), the method 300 and the associated apparatus 100 can enhance the overall performance of the electronic device and improve the user experience with less side effect.

Figure 4:
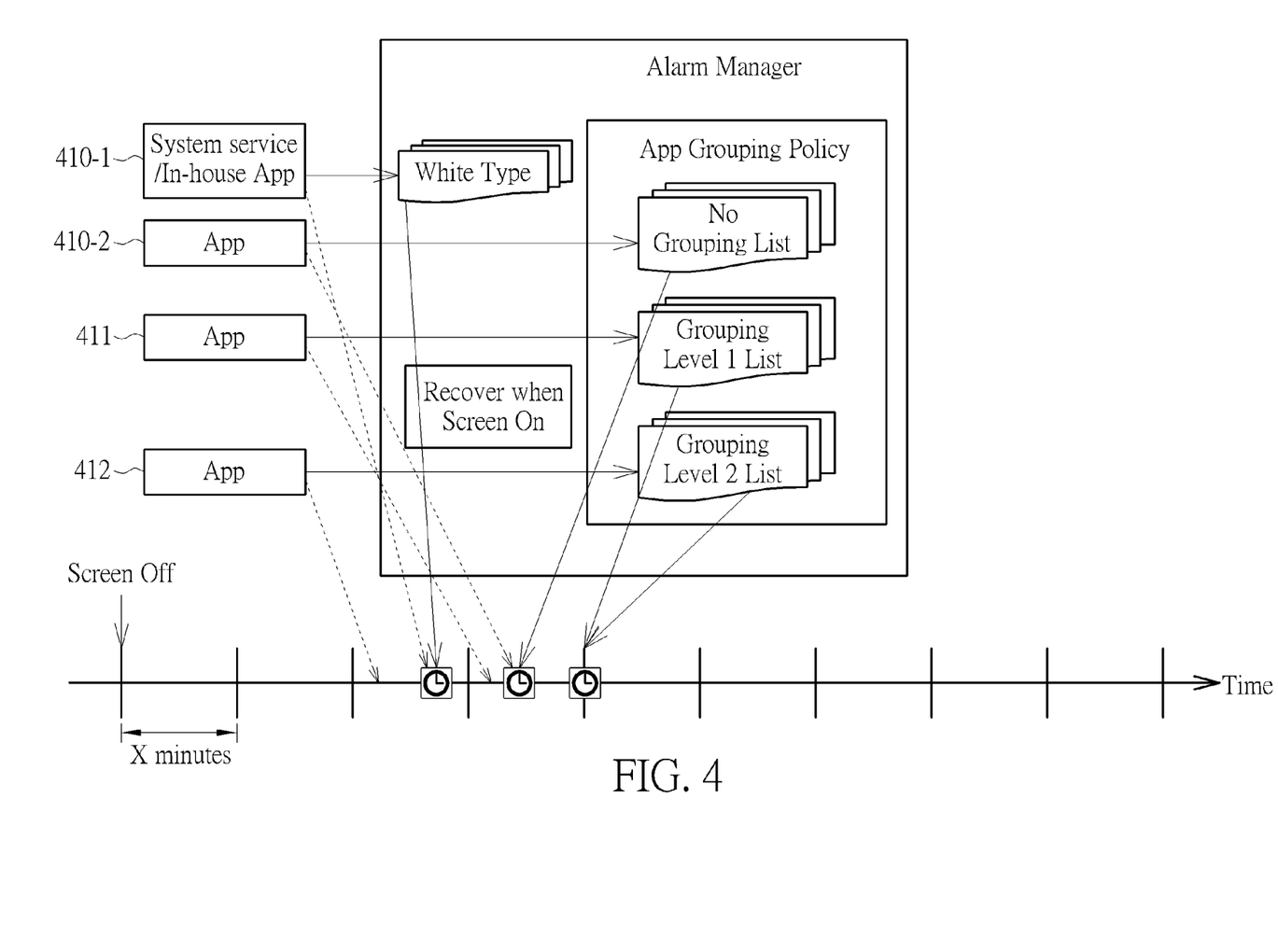
FIG. 4 illustrates an alarm grouping control scheme involved with the method shown in FIG. 3 according to an embodiment of the present invention.

FIG. 4 illustrates an alarm grouping control scheme involved with the method 300 shown in FIG. 3 according to an embodiment of the present invention. The alarm manager shown in FIG. 4 can be taken as an example of the alarm grouping control module 112, and the application (App) grouping policy shown in FIG. 4 can be taken as an example of the self-learning application grouping policy mentioned in the embodiment shown in FIG. 1. In addition, the sub-module labeled "Recover when Screen On" within the alarm manager shown in FIG. 4 can be taken as an example of the recovery mechanism mentioned in the embodiment shown in FIG. 1.

As shown in FIG. 4, there are four applications 410-1, 410-2, 411, and 412 for the processing circuit 110 (e.g. the alarm grouping control module 112 thereof) to determine whether they belong to one or more white types and/or categorize into one or more categories. The application 410-1 may be a system process application and/or an in-house application. The application 410-2, 411, and 412 may be any type of applications. Examples of the system process applications may include, but not limited to, keyguard (e.g. an application that lock screen of a mobile phone), GPS, VoIP, etc. Examples of the in-house applications may include, but not limited to, alarm clock, calendar, stopwatch etc. Examples of other types of applications may include, but not limited to, instant messaging application, social networking applications, mail service, etc.

In this embodiment, applications installed before the electronic device is sold to the user may belong to at least one white type. A system service application and/or an in-house application may be installed before the electronic device is sold to the user. Thus, in this embodiment, the processing circuit 110 (e.g. the alarm grouping control module 112 thereof) may check at least one of the applications 410-1, 410-2, 411 and 412 and determine that the application 410-1 belongs to at least one white type. In addition, the processing circuit 110 (e.g. the alarm grouping control module 112 thereof) may perform a learning operation by analyzing an application activity of at least one of the applications 410-1, 410-2, 411 and 412 to categorize the at least one application into one or more of a plurality of categories. In this embodiment, analyzing an application activity of an application may include, but not limited to, obtaining at least one of alarm usage, data usage, power consumption of the application. In some embodiments, higher alarm usage and/or higher data usage may cause higher power consumption.

In this embodiment, according to the learning operation performed by the processing circuit 110 (e.g. the alarm grouping control module 112 thereof), the application 410-2 may be categorized into the no grouping category associated with a no grouping list; the application 411 may be categorized into the grouping level 1 category associated with a grouping level 1 list; and the application 412 may be categorized into the grouping level 2 category associated with a grouping level 2 list. In this embodiment, the grouping categories may correspond to different alarm usage levels, different data usage levels, different power consumption levels or a combination thereof. For one example, the grouping level 2 category may correspond to a power consumption level higher than that of grouping level 1 category, and the grouping level 1 category may correspond to a power consumption level higher than that of no grouping category. For another example, the grouping level 2 category may correspond to a data usage level higher than those of grouping level 1 category and no grouping category, and the grouping level 1 category may correspond to an alarm usage level higher than that of no grouping category. This is for illustrative purposes only, and is not meant to be a limitation of the present invention. According to some embodiments, categorizing applications may be based on power consumption. For example, the processing circuit 110 may directly record the power consumption of the electronic device. In some of these embodiments, the processing circuit 110 may directly record the power consumption (of the electronic device) associated to one or more applications when the one or more applications are running. In some of these embodiments, the processing circuit 110 may directly record the power consumption (of the electronic device) associated to one or more applications when the one or more applications are not running. In some of these embodiments, the processing circuit 110 may estimate the power consumption (of the electronic device) associated to one or more applications according to at least one of the data usage, the alarm usage, the issued instructions, the consumed current, etc.

According to this embodiment, the processing circuit 110 (e.g. the alarm grouping control module 112 thereof, such as the alarm manager shown in FIG. 4) may prevent an execution timing of an alarm registered by an application from being shifted from an original execution timing according to whether the application belongs to at least one white type. For example, the alarm manager may prevent an alarm registered by the application 410-1 from being shifted from an original execution timing since the application 410-1 belongs to at least one white type. For example, the arrow illustrated with a dashed line from the application 410-1 may indicate the original execution timing of this alarm, and the arrow illustrated with a non-dashed line from the whit type corresponding to the application 410-1 may indicate that the execution timing of this alarm has not been shifted from the original execution timing.

Besides, the processing circuit 110 (e.g. the alarm grouping control module 112 thereof, such as the alarm manager shown in FIG. 4) may determine whether to shift an execution timing of an alarm registered by the application according to the category into which the application is categorized.

For example, for the application 410-2 that is categorized into no grouping category, the alarm manager may prevent an execution timing of an alarm registered by the application 410-2 from being shifted from an original execution timing, and therefore this alarm may not be grouped into any grouped alarm. For example, the arrow illustrated with a dashed line from the application 410-2 may indicate the original execution timing of this alarm, and the arrow illustrated with a non-dashed line from the no grouping list corresponding to the application 410-2 may indicate that the execution timing of this alarm has not been shifted from the original execution timing.

Additionally, after the screen of the electronic device is turned off (labeled "Screen Off" in FIG. 4, for better comprehension) and has been kept off for a predetermined length of time (e.g. X minutes, where the notation "X" may represent a positive number), the alarm manager may shift an execution timing of an alarm registered by the application 411, and therefore this alarm may be grouped into a grouped alarm. For example, the arrow illustrated with a dashed line from the application 411 may indicate the original execution timing of this alarm, and the arrow illustrated with a non-dashed line from the grouping level 1 list corresponding to the application 411 may indicate that the execution timing of this alarm has been shifted.

Further, after the screen of the electronic device is turned off and has been kept off for a predetermined length of time (e.g. X minutes), the alarm manager may shift the execution timing of an alarm registered by the application 412, and therefore this alarm may be grouped into a grouped alarm. For example, the arrow illustrated with a dashed line from the application 412 may indicate the original execution timing of this alarm, and the arrow illustrated with a non-dashed line from the grouping level 2 list corresponding to the application 412 may indicate that the execution timing of this alarm has been shifted. As shown in FIG. 4, the execution timings of alarms registered by applications 411 and 412 may be grouped into a grouped alarm so that power consumption caused by alarms can be reduced. Besides, since the application 412 may correspond to a higher power consumption/alarm usage/data usage level than that of the application 411, the interval between the shifted execution timings of alarms registered by the application 412 may be longer than that of the application 411, to further reduce power consumption caused by the alarms.

Figure 5:
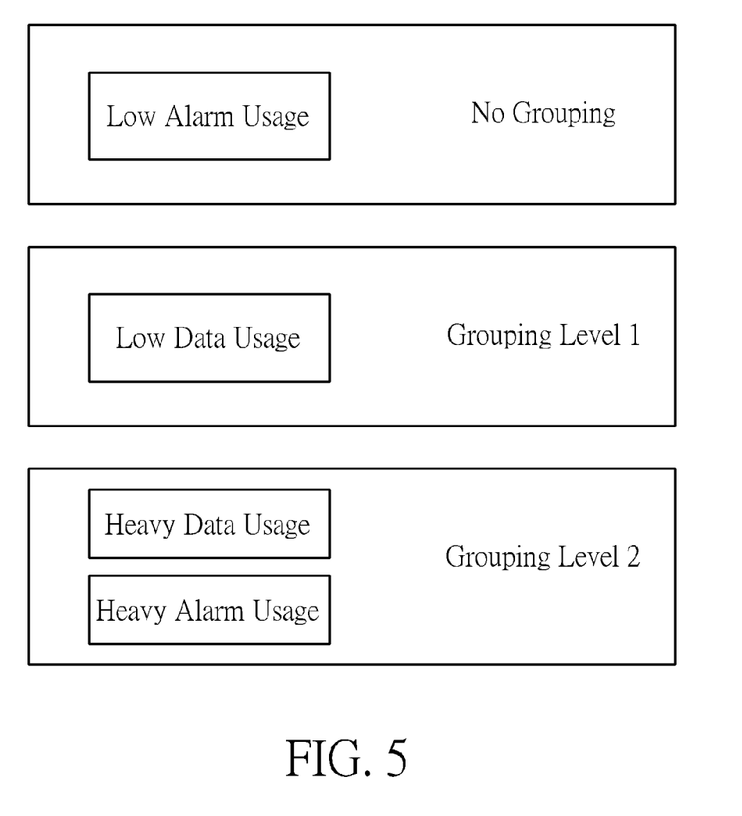
FIG. 5 illustrates some categories involved with the method shown in FIG. 3 according to an embodiment of the present invention.

FIG. 5 illustrates some categories involved with the method 300 shown in FIG. 3 according to an embodiment of the present invention. The no grouping category (labeled "No Grouping" in FIG. 5, for brevity) may correspond to the no grouping list in FIG. 4, the grouping level 1 category (labeled "Grouping Level 1" in FIG. 5, for brevity) may correspond to the grouping level 1 list in FIG. 4, and the grouping level 2 category (labeled "Grouping Level 2" in FIG. 5, for brevity) may correspond to the grouping level 2 list in FIG. 4.

According to this embodiment, the processing circuit 110 (e.g. the alarm grouping control module 112 thereof) may categorize applications having low alarm usage into the no grouping category. For example, these applications may comprise an alarm clock application, a calendar application, and a stopwatch application, where these applications may use alarms infrequently (e.g. less than N times per hour, N can be 2 to 4 or any other suitable number). In addition, the processing circuit 110 may categorize applications having low data usage with high alarm usage (labeled "Low Data Usage" in FIG. 5, for better comprehension) into the grouping level 1 category. For example, these applications may comprise instant messaging applications, where these applications may have low data usage (e.g. less than X bytes per hour, X can be 5 to 20K or any other suitable number) but use alarms frequently (e.g. between N to M times per hour, N can be 2 to 4 or any other suitable number, M can be 4 to 10 or any other suitable number). Additionally, the processing circuit 110 may categorize applications having heavy data usage (labeled "Heavy Data Usage" in FIG. 5, for better comprehension) into the grouping level 2 category. For example, these applications may comprise mail applications, social networking applications, news applications, download applications, peer-to-peer (P2P) applications, etc., where these applications may have heavy data usage (e.g. not less than X bytes per hour, X can be 5 to 20K or any other suitable number). Further, the processing circuit 110 may also categorize applications having heavy alarm usage (labeled "Heavy Alarm Usage" in FIG. 5, for better comprehension) into the grouping level 2 category. For example, these applications may comprise some excessive alarm usage applications such as QQ and MSN, where these applications may have heavy alarm usage and use alarms frequently (e.g. not less than M times per hour, M can be 4 to 10 or any other suitable number). Please note that N or M times per hour and X bytes per hour are only examples of alarm usage and data usage, but not limitations. The criteria of categorizing may vary with different design requirements.

Figure 6:
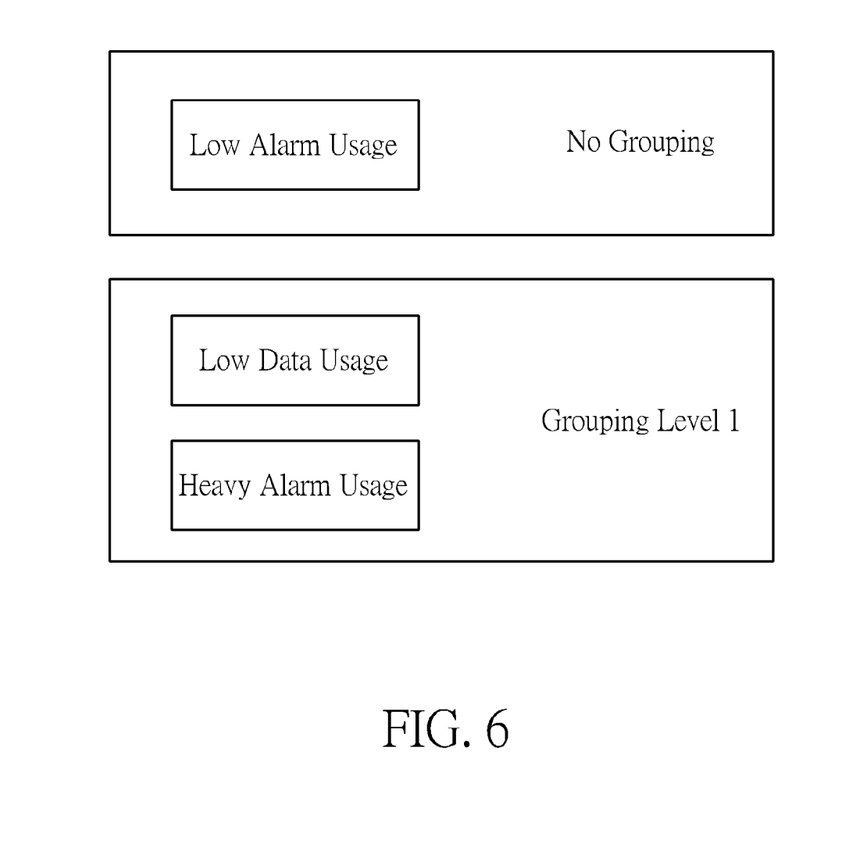
FIG. 6 illustrates some categories involved with the method shown in FIG. 3 according to another embodiment of the present invention.

FIG. 6 illustrates some categories involved with the method 300 shown in FIG. 3 according to another embodiment of the present invention. In comparison with the embodiment shown in FIG. 5, categorizing is simplified in this embodiment, where the application 410-2 may be categorized into the no grouping category (labeled "No Grouping" in FIG. 6, for brevity), and the applications 411 and 412 may be categorized into the grouping level 1 category (labeled "Grouping Level 1" in FIG. 6, for brevity).

According to this embodiment, the processing circuit 110 (e.g. the alarm grouping control module 112 thereof) may categorize applications having low alarm usage into the no grouping category. In addition, the processing circuit 110 (e.g. the alarm grouping control module 112 thereof) may categorize applications having low data usage into the grouping level 1 category. Additionally, the processing circuit 110 (e.g. the alarm grouping control module 112 thereof) may also categorize applications having heavy alarm usage into the grouping level 1 category. In this embodiment, the criteria of categorizing (e.g. the number of alarms triggered per hour corresponding to low alarm usage, the data volume downloaded/uploaded per hour or number of packets transferred per hour corresponding to low data usage, etc.) may be similar to or different from those of the embodiment shown in FIG. 5, and may vary with different design requirements.

Figure 7:
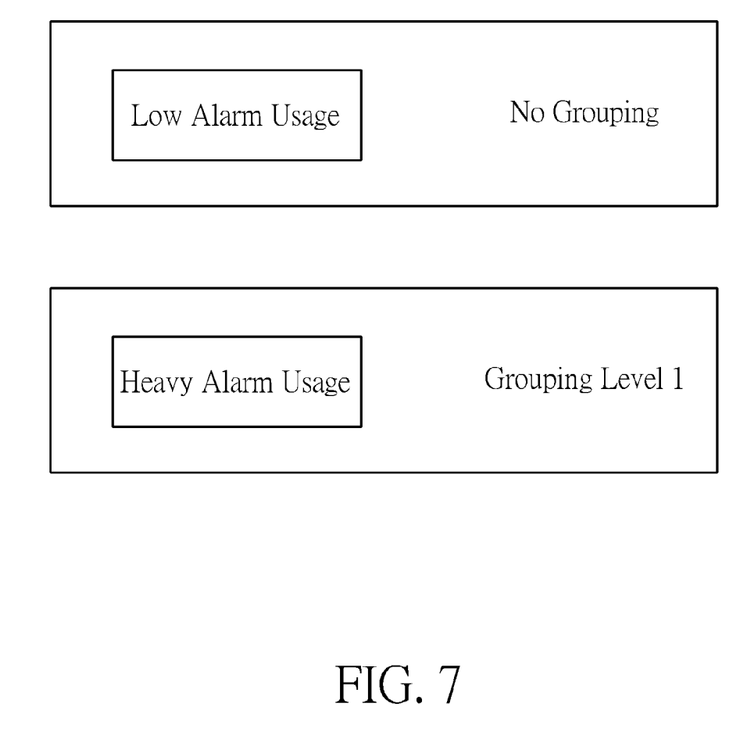
FIG. 7 illustrates some categories involved with the method shown in FIG. 3 according to another embodiment of the present invention.

FIG. 7 illustrates some categories involved with the method 300 shown in FIG. 3 according to another embodiment of the present invention. In comparison with the embodiment shown in FIG. 5, categorizing is simplified in this embodiment, where the application 410-2 may be categorized into the no grouping category (labeled "No Grouping" in FIG. 7, for brevity), and the applications 411 and 412 may be categorized into the grouping level 1 category (labeled "Grouping Level 1" in FIG. 7, for brevity).

According to this embodiment, the processing circuit 110 (e.g. the alarm grouping control module 112 thereof) may categorize applications having low alarm usage into the no grouping category. In addition, the processing circuit 110 (e.g. the alarm grouping control module 112 thereof) may categorize applications having heavy alarm usage into the grouping level 1 category. In this embodiment, the criteria of categorizing (e.g. the number of alarms triggered per hour corresponding to low alarm usage, the data volume downloaded/uploaded per hour or number of packets transferred per hour corresponding to low data usage, etc.) may be similar to or different from those of the embodiment shown in FIG. 5, and may vary with different design requirements.

Figure 8:
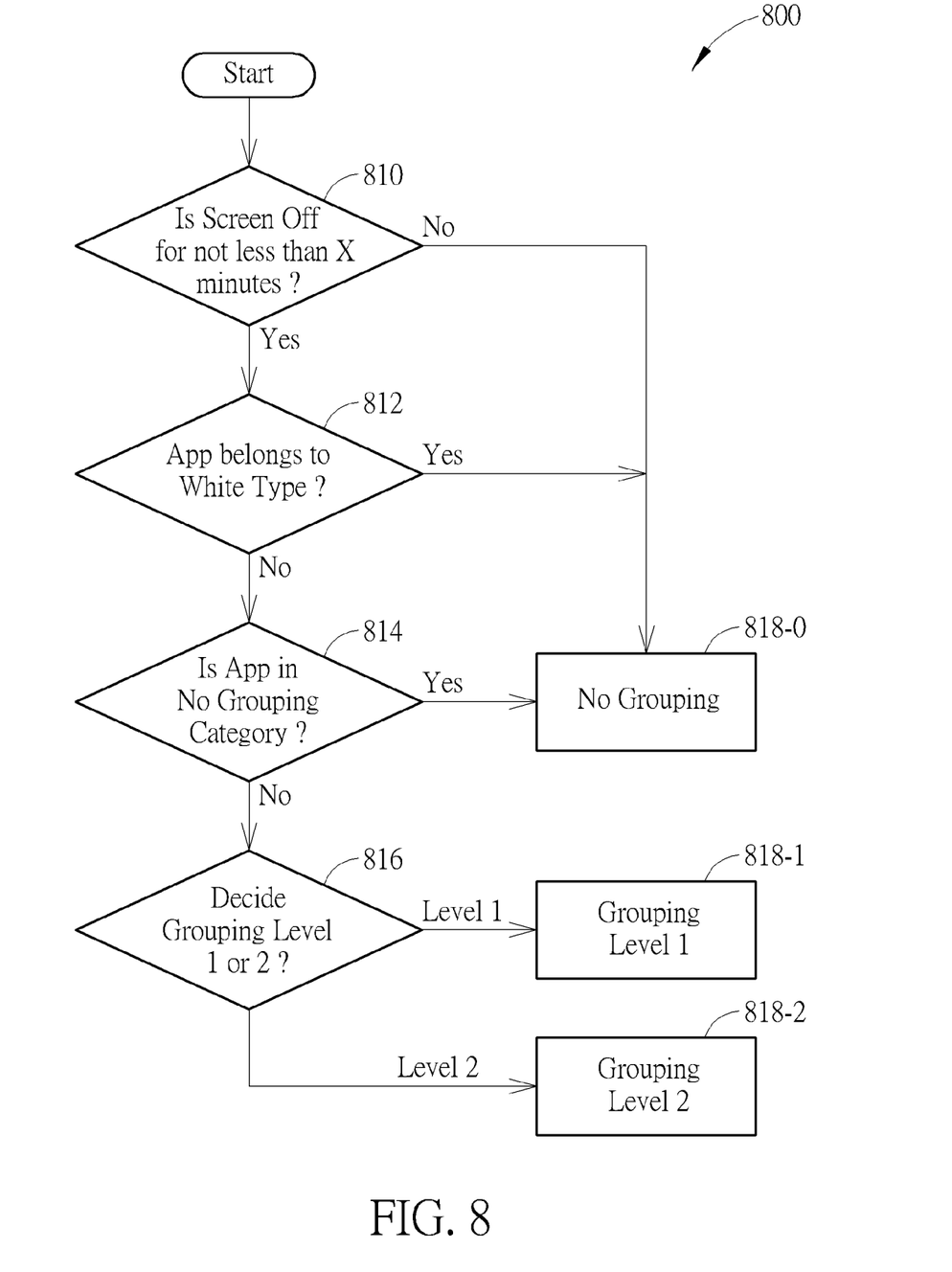
FIG. 8 illustrates a working flow involved with the method shown in FIG. 3 according to an embodiment of the present invention.

FIG. 8 illustrates a working flow 800 involved with the method 300 shown in FIG. 3 according to an embodiment of the present invention. For one example, when a screen of the electronic device is turned off, the working flow 800 shown in FIG. 8 may be triggered. For another example, when an application sets an alarm, the working flow 800 shown in FIG. 8 may be triggered.

In Step 810, the processing circuit 110 (e.g. the alarm grouping control module 112 thereof) may check whether the screen is off for not less than X minutes (mins). When it is detected that the screen is off for not less than X minutes, Step 812 may be entered; otherwise, Step 818-0 may be entered.

In Step 812, the processing circuit 110 (e.g. the alarm grouping control module 112 thereof) may determine whether this application belongs to at least one white type (e.g. the aforementioned at least one white type). When it is determined that this application belongs to at least one white type, Step 818-0 may be entered; otherwise, Step 814 may be entered.

In Step 814, the processing circuit 110 (e.g. the alarm grouping control module 112 thereof) may check whether this application is in any no grouping category such as the no grouping category. When it is detected that this application is in the no grouping category, Step 818-0 may be entered; otherwise, Step 816 may be entered.

In Step 816, the processing circuit 110 (e.g. the alarm grouping control module 112 thereof) may decide whether this application belongs to the grouping levels 1 or 2, and more particularly, may decide whether this application is in the grouping level 1 category or the grouping level 2 category. When it is detected that this application is in the grouping level 1 category (i.e. in the case of "Level 1" shown in FIG. 8), Step 818-1 may be entered; otherwise (i.e. in the case of "Level 2" shown in FIG. 8), Step 818-2 may be entered.

In Step 818-0, the processing circuit 110 (e.g. the alarm grouping control module 112 thereof) may prevent an execution timing of an alarm registered by the application from being shifted from an original execution timing.

In Steps 818-1 and 818-2, the processing circuit 110 (e.g. the alarm grouping control module 112 thereof) may shift an execution timing of an alarm registered by the application to an execution timing of at least one grouped alarm. The shift amount for an application categorized into grouping level 1 may be different from that for an application categorized into grouping level 2.

As a result of performing the operations of the grouping decision flow such as the working flow 800 shown in FIG. 8, the alarm grouping control scheme shown in FIG. 4 can be applied to the apparatus 100 properly. It should be noted that one or more steps shown in FIG. 8 may be omitted according to different design requirements, for example, steps 816 and 818-2 may be omitted when there is no grouping level 2 category. One or more steps may be added according to different design requirements, for example, one or more steps may be added when there is more grouping levels. Besides, the order of steps shown in FIG. 8 is for illustration only, but not limitation.

Figure 9:
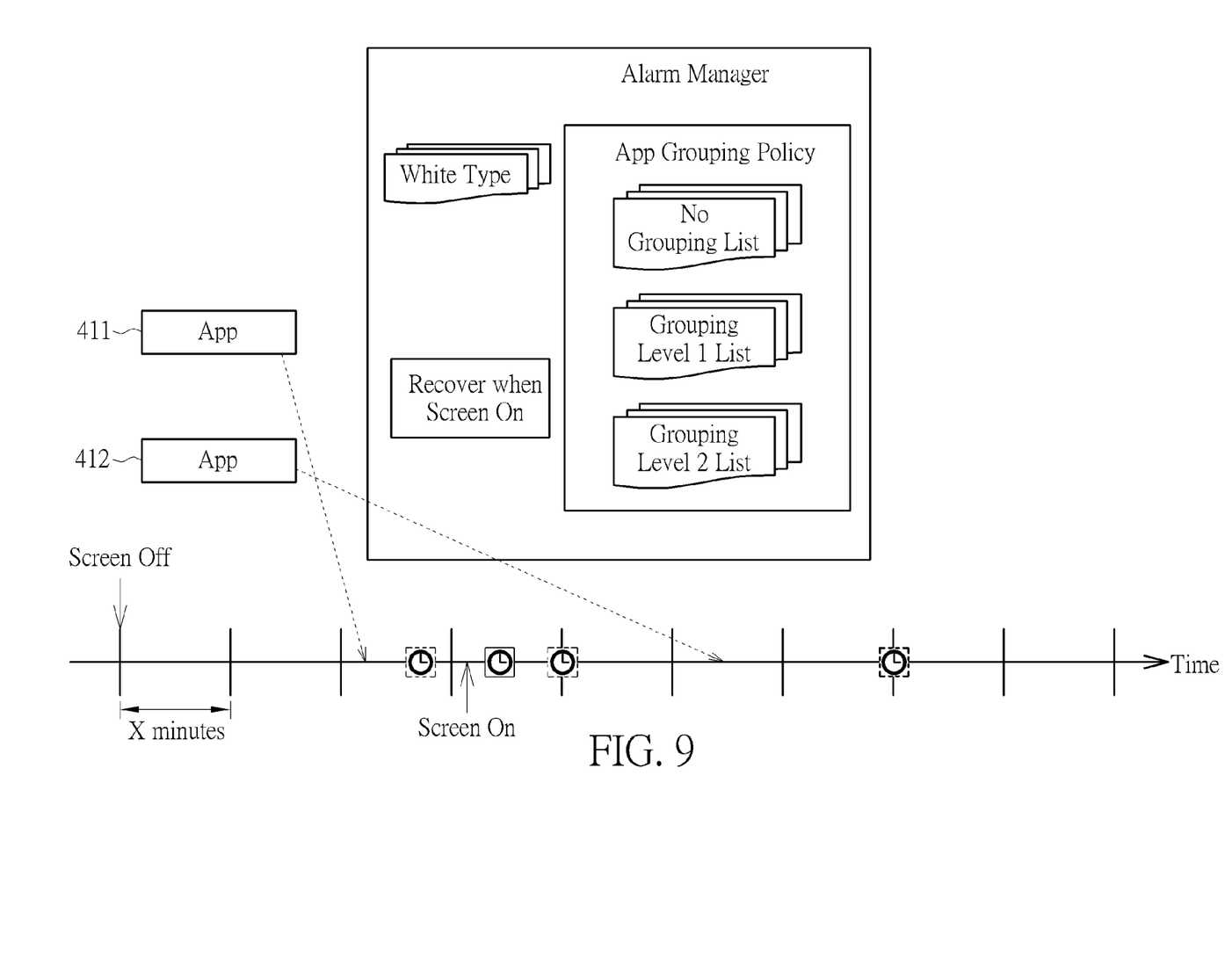
FIG. 9 illustrates an alarm recovery control scheme involved with the method shown in FIG. 3 according to an embodiment of the present invention.

FIG. 9 illustrates an alarm recovery control scheme involved with the method 300 shown in FIG. 3 according to an embodiment of the present invention. When the screen is turned on, the processing circuit 110 (e.g. the alarm grouping control module 112 thereof) may execute an alarm if the original execution timing of the alarm has expired, and/or recover an alarm by shifting the execution timing back to the original execution timing of the alarm. The alarm manager shown in FIG. 9 and the application (App) grouping policy shown in FIG. 9 can be the same as those in the embodiment shown in FIG. 4, respectively.

According to this embodiment, the sub-module labeled "Recover when Screen On" within the alarm manager shown in FIG. 9 can be the same as that in the embodiment shown in FIG. 4, and can be utilized for performing one or more operations regarding the alarm recovery control scheme. Example of the operations regarding the alarm recovery control scheme may include, but not limited to, the operation of recording an original execution timing of at least one alarm, the operation of recovering the at least one alarm by shifting the execution timing back to the original execution timing, when the screen is turned on (labeled "Screen On" in FIG. 9, for better comprehension). As a result, the applications may perform the expected operations (i.e. what they want to do) at the expected time when the screen is turned on. Therefore, based on the architecture shown in FIG. 1 and the method 300 shown in FIG. 3, the impact of alarm grouping performed when the screen is off can be lessen.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing alarm grouping control of an electronic device, comprising:

shifting, by a processing circuit of an apparatus comprising at least one portion of the electronic device, an execution timing of at least one alarm of a plurality of alarms to group the plurality of alarms into at least one grouped alarm according to at least one grouping control strategy, wherein the plurality of alarms are registered by a plurality of applications, wherein the at least one grouping control strategy corresponds to a plurality of categories of the plurality of applications, and wherein the execution timing of the at least one alarm is shifted to an execution timing of the at least one grouped alarm;

according to the at least one grouped alarm, controlling, by the processing circuit, whether to wake up at least a portion of the electronic device; and analyzing, by the processing circuit, activities of one or more applications of the plurality of applications as part of the at least one grouping control strategy.

2. The method of claim 1, wherein the at least one grouping control strategy comprises a self-learning strategy, wherein the analyzing of the activities of the one or more applications comprises categorizing an application of the plurality of applications into a category of the plurality of categories, and wherein the method further comprises:

determining whether to shift an execution timing of an alarm registered by the application of the plurality of applications according to the category into which the application is categorized, wherein the analyzing of the activities of the one or more applications comprises obtaining information on alarm usage, data usage, power consumption, or a combination thereof, with respect to each of the one or more applications.

3. The method of claim 2, wherein at least two of the plurality of categories correspond to different alarm usage levels, respectively.

4. The method of claim 3, wherein a specific application of the plurality of applications is categorized into a category corresponding to a minimum alarm usage level within the alarm usage levels; and the method further comprises:

preventing an execution timing of an alarm registered by the specific application from being shifted from an original execution timing.

5. The method of claim 2, wherein at least two of the plurality of categories correspond to different data usage levels, respectively.

6. The method of claim 5, wherein a specific application of the plurality of applications is categorized into a category corresponding to a minimum data usage level within the data usage levels; and the method further comprises:

allowing an execution timing of an alarm registered by the specific application to be shifted.

7. The method of claim 2, wherein at least two of the plurality of categories correspond to different power consumption levels, respectively.

8. The method of claim 7, wherein a specific application of the plurality of applications is categorized into a category corresponding to a minimum power consumption level within the power consumption levels; and the method further comprises:

preventing an execution timing of an alarm registered by the specific application from being shifted from an original execution timing.

9. The method of claim 1, further comprising:

recording an original execution timing of the at least one alarm.

10. The method of claim 9, further comprising:

when a screen of the electronic device is turned on, recovering the at least one alarm by shifting the execution timing of the at least one alarm back to the original execution timing.

11. The method of claim 1, wherein the at least one grouping control strategy comprises a white type strategy; and the method further comprises:

determining whether an application of the plurality of applications is categorized into at least one white type to generate a determining result; and preventing an execution timing of an alarm registered by the application from being shifted from an original execution timing according to the determining result.

12. The method of claim 1, further comprising:

comparing a length of a time period during which a screen of the electronic device is kept off with a predetermined threshold to generate a comparing result; and determining whether to perform alarm grouping control according to the comparing result.

13. The method of claim 1, further comprising:

when it is detected that charging the electronic device is performed, preventing performing alarm grouping control.

14. An apparatus for performing alarm grouping control of an electronic device, the apparatus comprising at least one portion of an electronic device, the apparatus comprising:

a processing circuit, capable of controlling operations of the electronic device, wherein the processing circuit comprises:
- an alarm grouping control module, capable of shifting an execution timing of at least one alarm of a plurality of alarms to group the plurality of alarms into at least one grouped alarm according to at least one grouping control strategy, the alarm grouping control module further capable of analyzing activities of one or more applications of a plurality of applications as part of the at least one grouping control strategy, wherein the plurality of alarms are registered by the plurality of applications, wherein the at least one grouping control strategy corresponds to a plurality of categories of the plurality of applications, and wherein the execution timing of the at least one alarm is shifted to an execution timing of the at least one grouped alarm; and
- a wake-up control module, wherein according to the at least one grouped alarm, the wake-up control module is capable of controlling whether to wake up at least a portion of the electronic device.

15. The apparatus of claim 14, wherein the at least one grouping control strategy comprises a self-learning strategy, wherein, in analyzing the activities of the one or more applications, the processing circuit is capable of categorizing an application of the plurality of applications into a category of the plurality of categories, wherein the processing circuit is further capable of determining whether to shift an execution timing of an alarm registered by the application according to the category into which the application is categorized, and wherein, in analyzing of the activities of the one or more applications, the processing circuit is capable of obtaining information on alarm usage, data usage, power consumption, or a combination thereof, with respect to each of the one or more applications.

16. The apparatus of claim 15, wherein at least two of the plurality of categories correspond to different power consumption levels, respectively; a specific application of the plurality of applications is categorized into a category corresponding to a minimum power consumption level within the power consumption levels; and the processing circuit is further capable of preventing an execution timing of an alarm registered by the specific application from being shifted from an original execution timing.

17. The apparatus of claim 15, wherein at least two of the plurality of categories correspond to different alarm usage levels, respectively; a specific application of the plurality of applications is categorized into a category corresponding to a minimum alarm usage level within the alarm usage levels; and the processing circuit is further capable of preventing an execution timing of an alarm registered by the specific application from being shifted from an original execution timing.

18. The apparatus of claim 14, wherein the processing circuit is further capable of recording an original execution timing of the at least one alarm, and when a screen of the electronic device is turned on, recovering the at least one alarm by shifting the execution timing of the at least one alarm back to the original execution timing.

19. The apparatus of claim 14, wherein the at least one grouping control strategy comprises a white type strategy; and the processing circuit is further capable of determining whether an application of the plurality of applications is categorized into at least one white type to generate a determining result and preventing an execution timing of an alarm registered by the application from being shifted from an original execution timing according to the determining result.

20. The apparatus of claim 14, wherein the processing circuit is further capable of comparing a length of a time period during which a screen of the electronic device is kept off with a predetermined threshold to generate a comparing result; and the processing circuit is further capable of determining whether to perform alarm grouping control according to the comparing result.

\* \* \* \* \*